United States Patent
Casey

(10) Patent No.: US 6,321,200 B1
(45) Date of Patent: Nov. 20, 2001

(54) METHOD FOR EXTRACTING FEATURES FROM A MIXTURE OF SIGNALS

(75) Inventor: Michael A. Casey, Cambridge, MA (US)

(73) Assignee: Mitsubish Electric Research Laboratories, INC, Cambridge, MA (US)

( * ) Notice: Subject to any disclaimer, the term of this patent is extended or adjusted under 35 U.S.C. 154(b) by 0 days.

(21) Appl. No.: 09/346,854

(22) Filed: Jul. 2, 1999

(51) Int. Cl.$^7$ ................................................ G10L 21/04
(52) U.S. Cl. ............................................ 704/500; 704/501
(58) Field of Search ..................... 704/500, 229, 704/230, 231

(56) References Cited

U.S. PATENT DOCUMENTS

| | | | |
|---|---|---|---|
| 4,720,802 | * 1/1988 | Damoulakis et al. | 704/233 |
| 5,315,532 | 5/1994 | Comon | 364/553 |
| 5,383,164 | 1/1995 | Sejnowski et al. | 67/134 |
| 5,602,751 | 2/1997 | Edelblute | 364/485 |
| 5,615,302 | * 3/1997 | McEachern | 704/205 |
| 5,632,003 | * 5/1997 | Davidson et al. | 704/230 |
| 5,893,058 | * 4/1999 | Kosaka | 704/254 |
| 5,913,188 | * 6/1999 | Tzirkel-Hancock | 704/223 |
| 5,946,656 | * 8/1999 | Rahim et al. | 704/256 |

OTHER PUBLICATIONS

Lee et al ("Combining Time–Delayed Decorrelation and ICA: Towards Solving the Cocktail Party Problem," Te–Won Lee; Ziehe, A.; Orglmeister, R.; Sejnowski, T., Proceedings of the 1998 IEEE International Conference on Acoustics, Speech and Signal Processing.*

Meyer–Baese et al ("Fast Implementation of Orthogonal Wavelet Filterbanks using Field–Programmable Logic," Meyer–Baese, U.; Buros, J.; Trautmann, W.; Taylor, F., IEEE International Conference on Acoustics, Speech, and Signal Processing, pp: 2119–2122.*

Michael A. Casey; "Auditory Group Theory with Applications to Statistical Basis Methods for Structured Audio".

Michael A. Casey; "Understanding Musical Sound with Forward Models and Physical Models"; Perceptual Computing Group, MIT Media Laboratory.

D.P.W. Ellis; "Prediction–Driven Computational Auditory Scene Analysis for Dense Sound Mixtures"; Paper presented at the ESCA workshop on the Auditory Basis of Speech Perception, Keele UK, Jul. 1996.

K.D. Martin; "Toward Automatic Sound Source Recognition: Identifying Musical Instruments"; Paper presented at the NATO Computational Hearing Advanced Study Institute, Il Ciocco, Italy, Jul. 1–12, 1998.

Huynh et al.; "Classification of Underwater Mammals using Feature Extraction Based on Time–Frequency Analysis and BCM Theory"; Physics Department and Institute for Brain and Neural System, Brown University.

Martin et al.; "2pMU9. Musical Instrument Identification: A Pattern–Recognition Approach"; Paper presented at 136$^{th}$ meeting of the Acoustical Society of America, Oct. 13, 1998.

N.N. Bitar et al.; "Integrationof STFT and Wigner Analysis in a Knowledge–Based System for Sound Understanding"; ECS Department, Brown University.

* cited by examiner

Primary Examiner—Richemond Dorvil
Assistant Examiner—Daniel A. Nolan
(74) Attorney, Agent, or Firm—Dirk Brinkman

(57) ABSTRACT

A method extracts features from a mixture of signals. The method filters the mixture of signals by a filterbank to produce a plurality of band-pass signals. Each band-pass signal is windowed to produce a plurality of multi-dimensional observation matrices. The multi-dimensional observation matrices are reduced in their dimensionality. Features are extracted from the reduced dimensionality matrices using independent component analysis. The features can include temporal and spectral characteristics.

20 Claims, 5 Drawing Sheets

METHOD FOR EXTRACTING FEATURES FROM A MIXTURE OF SIGNALS

FIELD OF THE INVENTION

The invention relates generally to the field of signal processing, and in particular to extracting features from a mixture of acoustic signals.

BACKGROUND OF THE INVENTION

To date, very little work has been done on characterizing environmental and ambient sounds. Most prior art acoustic signal representation methods have focused on human speech and music. However, there are no good representation methods for many sound effects heard in films, television, video games, and virtual environments, such footsteps, traffic, doors slamming, laser guns, hammering, smashing, thunder claps, leaves rustling, water spilling, etc. These environmental acoustic signals are generally much harder to characterize than speech and music because they often comprise multiple noisy and textured components, as well as higher-order structural components such as iterations and scattering.

One particular application that could use such a representation scheme is video processing. Methods are available for extracting, compressing, searching, and classifying video objects, see for example the various MPEG standards. No such methods exist for "audio" objects, other than when the audio objects are speech.

For example, it maybe desired to search through a video library to locate all video segments where John Wayne is galloping on a horse while firing his six-shooter. Certainly it is possible to visually identify John Wayne or a horse. But it much more difficult to pick out the rhythmic clippidy-clop of a galloping horse, and the staccato percussions of a revolver. Recognition of audio events can delineate action in video.

Another application that could use the representation is sound synthesis. It is not until the features of a sound are identified before it becomes possible to synthetically generate a sound, other than be trail and error.

In the prior art, representations for non-speech sounds have usually focused on particular classes of non-speech sound, for example, simulating and identifying specific musical instruments, distinguishing submarine sounds from ambient sea sounds and recognition of underwater mammals by their utterances. Each of these applications requires a particular arrangement of acoustic features that do not generalize beyond the specific application.

In addition to these specific applications, other work has focused on developing generalized acoustic scene analysis representations. This research has become known as Computational Auditory Scene Analysis. These systems require a lot of computational effort due to their algorithmic complexity. Typically, they use heuristic schemes from Artificial Intelligence as well as various inference schemes. Whilst such systems provide valuable insight into the difficult problem of acoustic representations, the performance of such systems has never been demonstrated to be satisfactory with respect to classification and synthesis of acoustic signals in a mixture.

Therefore, there is a need for a robust and reliable representation that can deal with a broad class of signal mixtures.

SUMMARY OF THE INVENTION

The invention provides a method for extracting features from a mixture of signals, for example, acoustic, electric, seismic, vibrational, and physiological signals. As a feature of the invention, an acoustic mixture can include non-speech sounds. The mixture can originate at a signal source, or multiple sources. The method filters the mixture of signals by one or more filterbanks to produce a plurality of filtered signals. The filtering can be frequency based, in which case the filtered signal is a band-pass signal. The filters can be logarithmic spaced, as in a constant-Q (CQ) or wavelet filterbank, or they can be linearly spaced as in a short time fast Fourier transform representation (STFT).

Each filtered signal is windowed to produce a plurality of multi-dimensional observation matrices. Each observation matrix contains frequency-domain samples corresponding 10–50 millisecond portions of the signal, if the signal is acoustic. For either types of signals different window sizes can be used. The multi-dimensional observation matrices are reduced in their dimensionality using a single value decomposition (SVD).

Temporal and spectral features are extracted from the reduced dimensionality matrices using independent component analysis. The features can include temporal and spectral characteristics. The features can be used for signal classification, synthesis, comparing, and compression.

DETAILED DESCRIPTION OF THE PREFERRED EMBODIMENT

Figure 1:
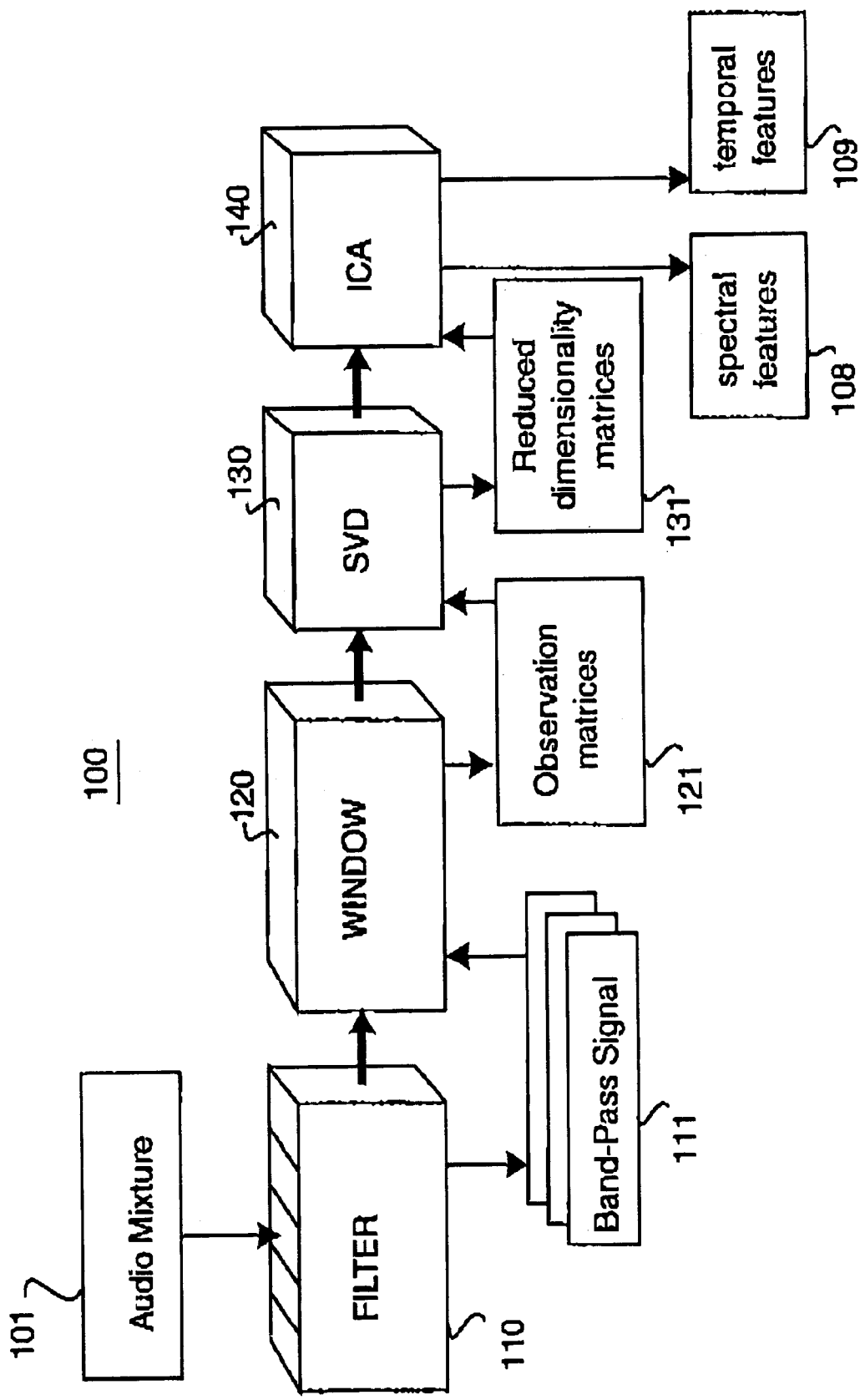
FIG. 1 is a flow diagram of a method for extracting features from a mixture of signals according to the invention.

FIG. 1 shows a method 100 for extracting spectral and temporal features 108–109 from a mixture of signals 101 according to my invention. My method 100 can be used for characterizing and extracting features from sound recordings for classification of the sound sources and for re-purposing in structured multi-media applications such as parametric synthesis. The method can also be used to extract features from other linear mixtures, or for that matter from multi-dimensional mixtures. The mixture can be obtained from a single source, or from multiple sources such as a stereo sound source.

In order to extract features from recorded signals, I use statistical techniques based on independent component analysis (ICA). Using a contrast function defined on cumulant expansions up to a fourth order, the ICA transform generates a rotation of the basis of the time-frequency observation matrices 121.

The resulting basis components are as statistically independent as possible and characterize the structure of the individual features, e.g., sounds, within the mixture source 101. These characteristic structures can be used to classify the signal,, or to specify new signals with predictable features.

The representation according to my invention is capable of synthesizing multiple sound behaviors from a small set of features. It is able to synthesize complex acoustic event structures such as impacts, bounces, smashes and scraping as well as acoustic object properties such as materials, size and shape.

In the method 100, the audio mixture 101 is first processed by a bank of logarithmic filters 110. Each of the filters produces a band-pass signal 111 for a predetermined frequency range. Typically, forty to fifty band-pass signals 111 are produced with more signals at lower frequency ranges than higher frequency ranges to mimic the frequency response characteristics of the human ear. Alternatively, the filters can be a constant-Q (CQ) or wavelet filterbank, or they can be linearly spaced as in a short time fast Fourier transform representation (STFT).

Figure 2:
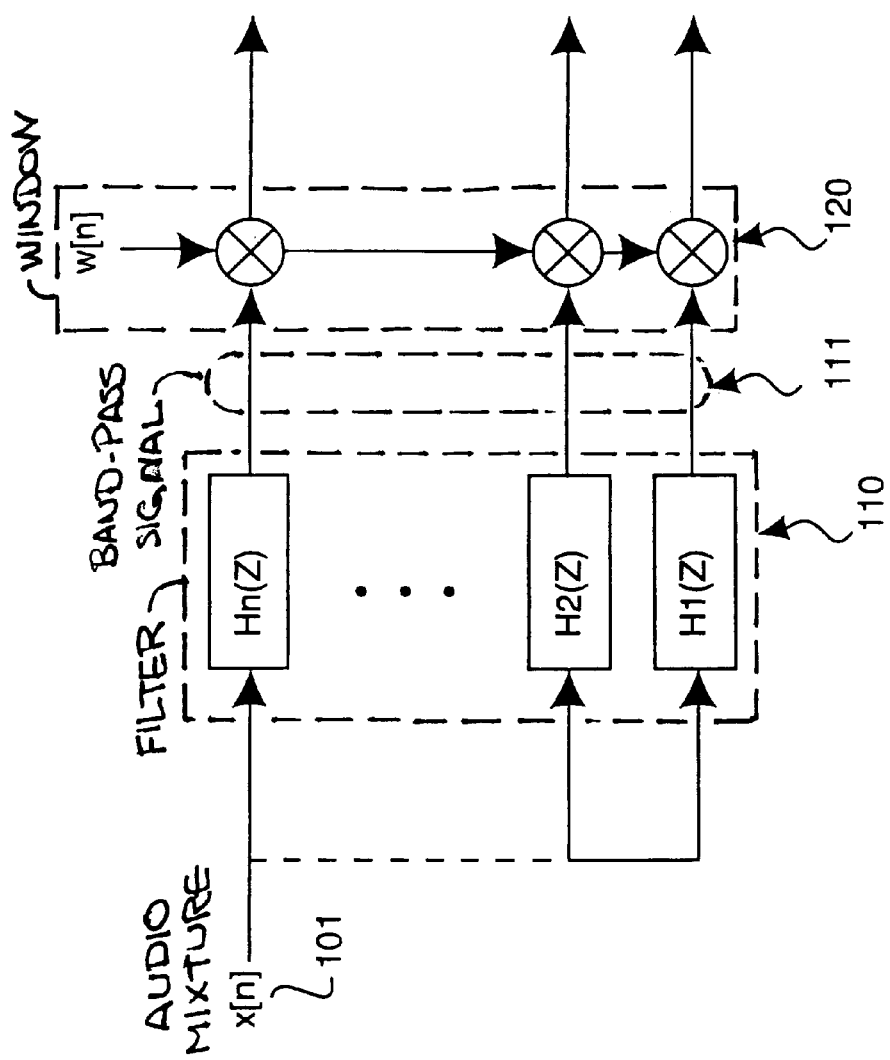
FIG. 2 is a block diagram of the flittering and windowing steps.

In step 120, each of the band-pass signals is "windowed" into short, for example, 20 millisecond segments to produce observation matrices. Each matrix can include hundreds of samples. The details of steps 110 and 120 are shown in greater detail in FIGS. 2 and 3.

In step 130 a singular value decomposition (SVD) is applied to the observation matrices 121 to produce reduced dimensionality of the matrices 131. SVD were first described by the Italian geometer Beltrami in 1873. The singular value decomposition is a well-defined generalization of the principal component analysis (PCA). The singular value decomposition of an m×n matrix is any factorization of the form:

$$X = U\Sigma V^T$$

where U is an m×m orthogonal matrix; i.e. U has orthonormal columns, V is an n×n orthogonal matrix, and $\Sigma$ is an m×n diagonal matrix of singular values with components $\sigma_{ij}=0$ if i is not equal to j.

As an advantage and in contrast with PCA, the SVD can decomposes a non-square matrix, thus it is possible to directly decompose the observation matrices in either spectral or temporal orientation without the need for a calculating a covariance matrix. Because the SVD decomposes a non-square matrix directly, without the need for a covariance matrix, the resulting basis is not as susceptible to dynamic range problems as the PCA.

I apply independent component analysis (ICA) in step 140 to the reduced dimensionality matrices 131. An ICA that uses an iterative on-line algorithm based on a neuro-mimetic architecture for blind signal separation is well known. Recently, many neural-network architectures have been proposed for solving the ICA problem, see for example, U.S. Pat. No. 5,383,164 "Adaptive system for broadband multisignal discrimination in a channel with reverberation," issued to Sejnowski on Jan. 17, 1995.

The ICA produces the spectral and temporal features 108–109. The spectral features, expressed as vectors, correspond to estimates of the statistically most independent component within a segmentation window. The temporal features, also expressed as vectors, described the evolution of the spectral components during the course of the segment.

Each pair of spectral and temporal vectors can be combined using a vector outer product to reconstruct a partial spectrum for the given input spectrum. If these spectra are invertible, as a filterbank representation would be, then the independent time-domain signals can be estimated. For each of the independent components described in the scheme, a matrix of compatibility scores for components in the prior segment is made available. This allows tracking of components through time by estimating the most likely successive correspondences. Identical to the backward compatibility matrix, only looking forward in time.

An independent components decomposition of an audio track may be used to estimate individual signal components within an audio track. Whilst the separation problem is intractable unless a full-rank signal matrix is available (N linear mixes of N sources), the use of independent components of short temporal sections of frequency-domain representations can give approximations to the underlying sources. These approximations can be used for classification and recognition tasks, as well as comparisons between sounds.

Figure 3:
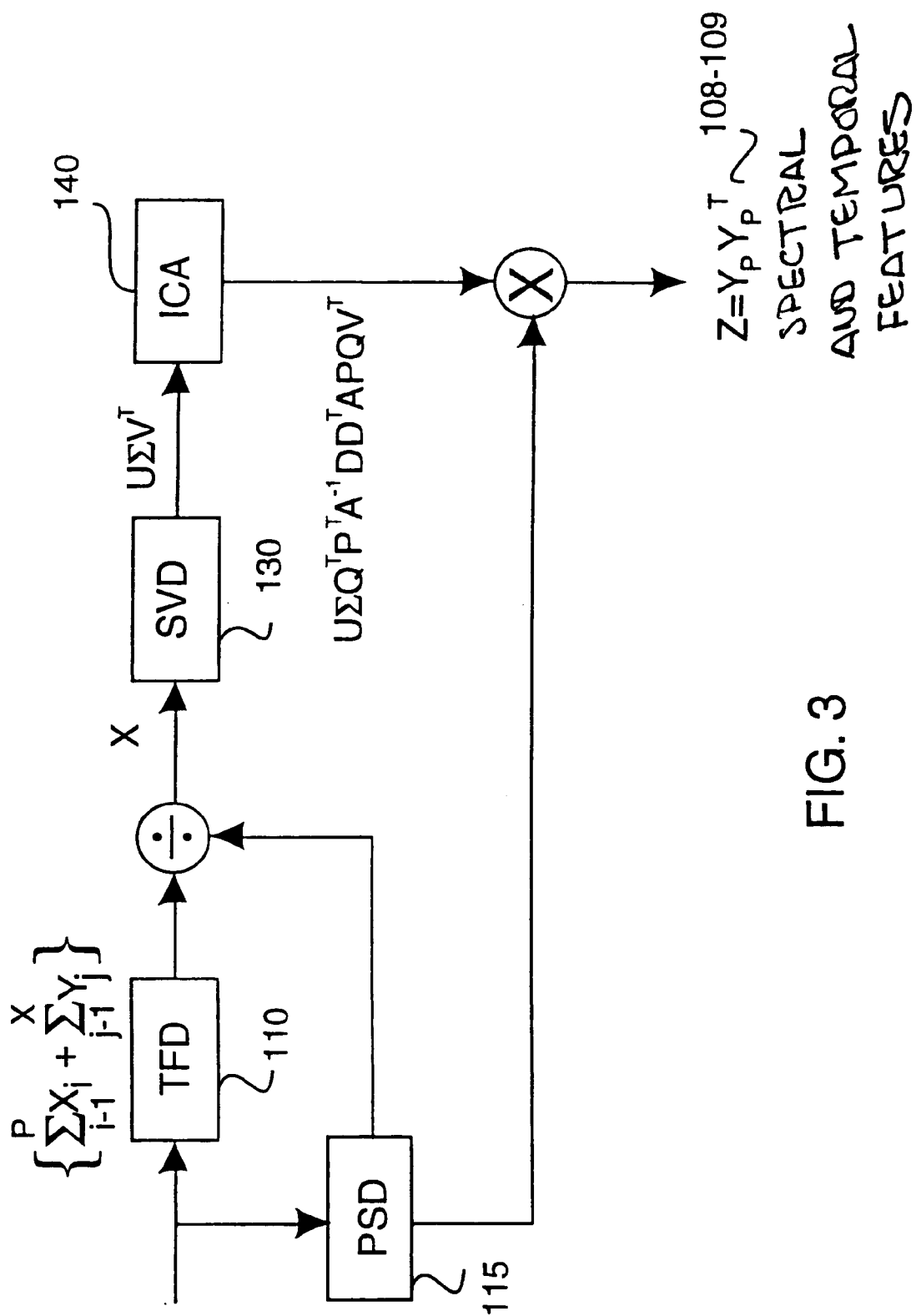
FIG. 3 is a block diagram of normalizing, reducing, and extracting steps.

As shown in FIG. 3, the time frequency distribution (TFD) can be normalized by the power spectral density (PSD) 115 to diminish the contribution of lower frequency components that carry more energy in some acoustic domains.

Figure 4:
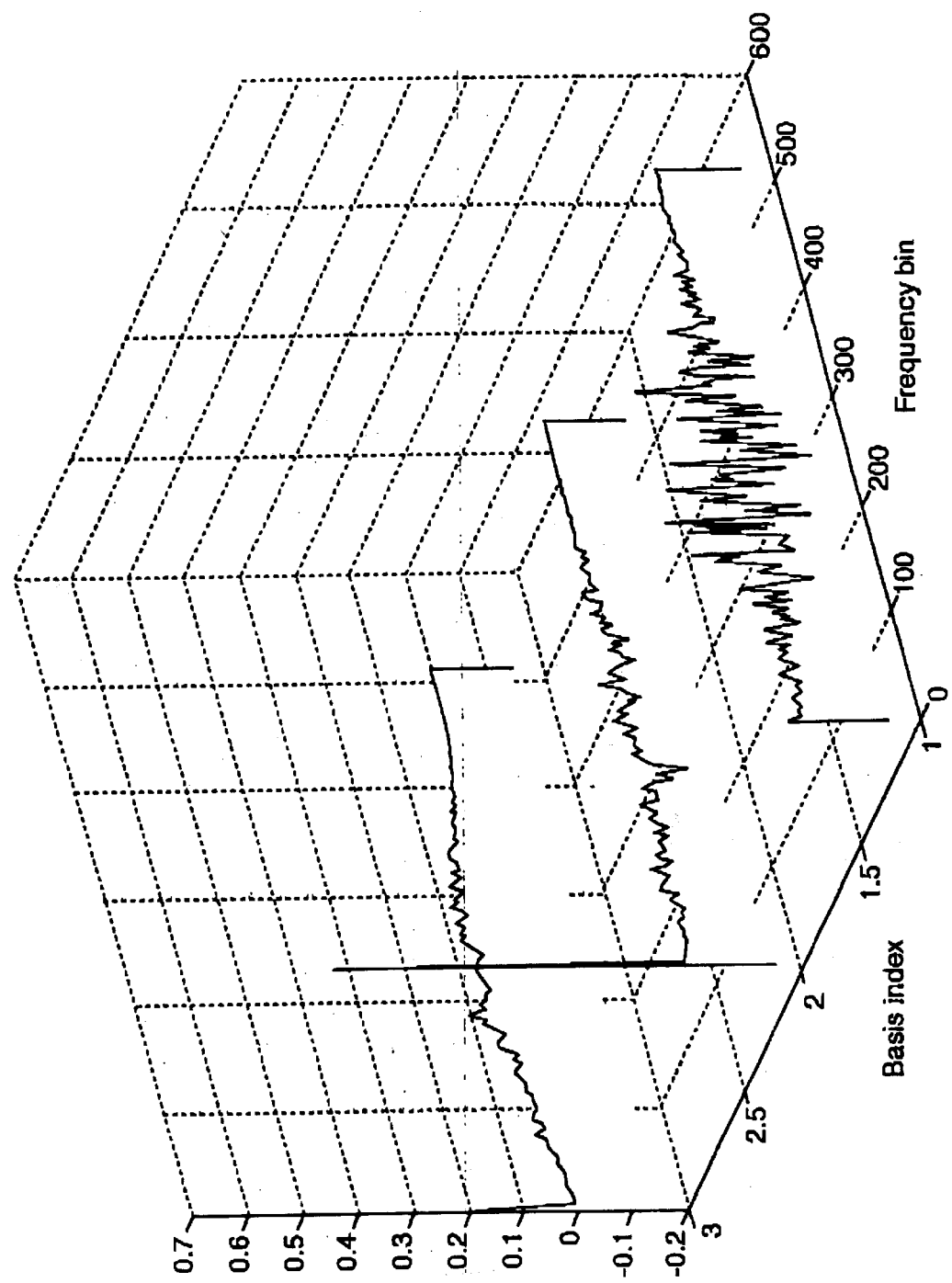
FIGS. 4 and 5 are graphs of features of a metallic shaker according to the invention.
Figure 5:
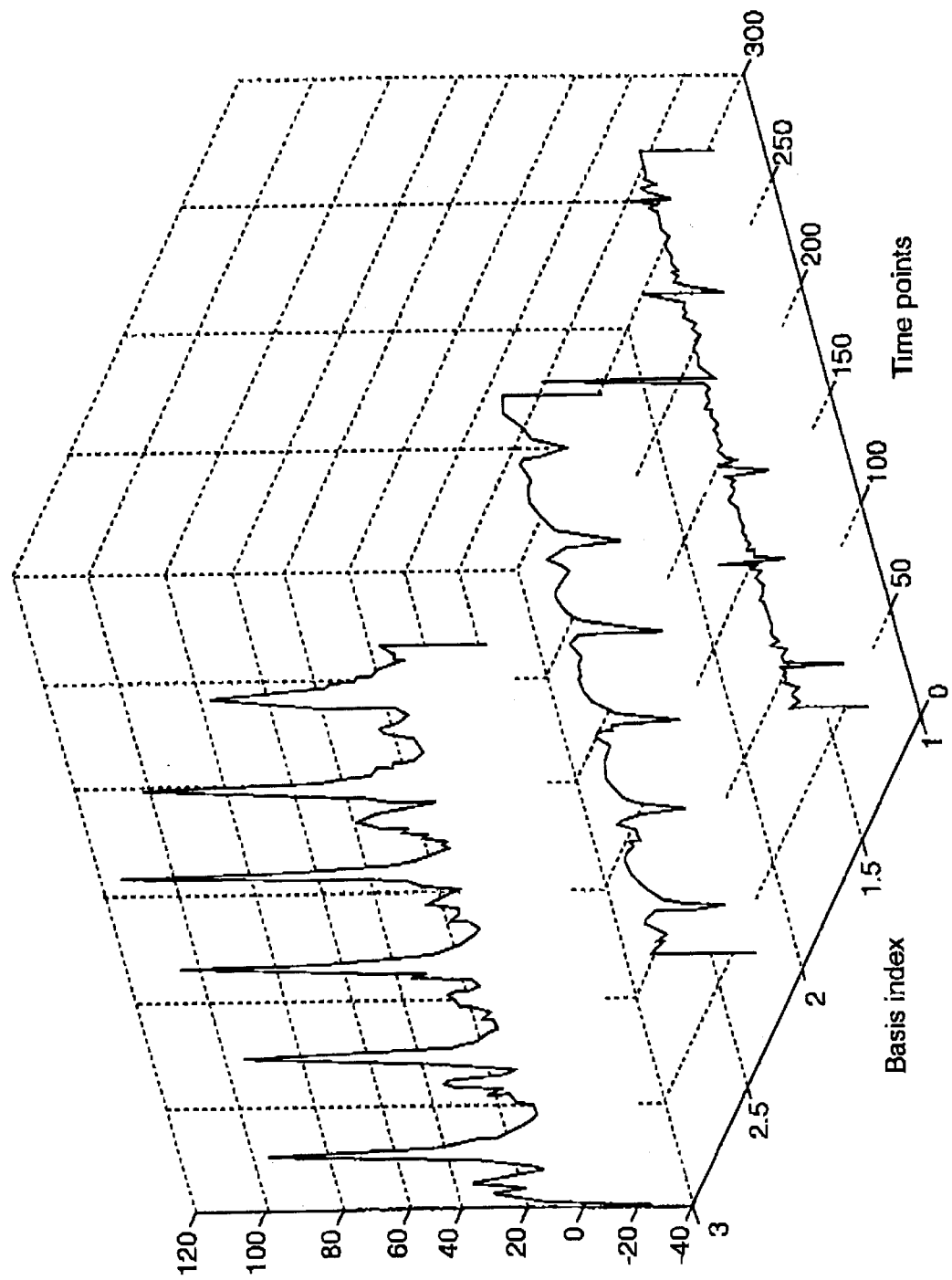

FIGS. 4 and 5 respectively show the temporal and spatial decomposition for a percussion shaker instrument played at a regular rhythm. The observable structures reveal wideband articulary components corresponding to the shakes, and horizontal stratification corresponding to the ringing of the metal shell.

Application

My invention can be used in a number of applications. The extracted features can be considered as the separable components of an acoustic mixture, therefore representing the inherent structure within the source. Extracted features can be compared against a set of a-priori classes, determined by pattern-recognition techniques, in order to recognize or identify the components. These classifiers may be in the domain of speech phonemes, sound effects, musical instruments, animal sounds or any other corpus-based analytic models. Extracted features can be re-synthesized independently using an inverse filter-bank thus achieving an "unmixing" of the source acoustic mixture. An example use separates the singer, drums and guitars from an acoustic recording in order to re-purpose some components or to automatically analyze the musical structure. Another example separates the actor's voice from background noise in order to pass the cleaned speech signal to a speech recognizer for automatic transcription of a movie.

The spectral features and temporal features can be considered separately in order to identify various properties of the acoustic structure of individual sound objects within a mixture. Spectral features can delineate such properties are materials, size, shape whereas temporal features can delineate behaviors such as bouncing, breaking and smashing. Thus a glass smashing can be distinguished from a glass bouncing or a clay pot smashing. Extracted features can be altered and re-synthesized in order to produce modified synthetic instances of the source sound. If the input sound is a single sound event comprising a plurality of acoustic features, such as a glass smash, then the individual features can be controlled for re-synthesis. This is useful for model-based media applications such as generating sound in virtual environments.

Advantages

The invention preserves the temporal structure of the components because each window is relatively small, for audio signals the window is approximately 50 milliseconds. The invention tracks time evolution of components using time-frequency adjacent compatibility functions. Statistically independent features correspond to individual events, based on the underlying physics. The invention provides for automatic extraction of mixed components, and algorithms for independent component extraction. A corpus-derived space can characterize large body of sounds, e.g., sound effects, musical instruments, voices, textures, environmental sounds. The invention can be used to build a coherent data scheme based on existing, for example, MPEG audio representation, and can take advantage of perceptual attributes of AAC encoding. The invention does not assumed a model or structure of input signal. The computational cost is relatively low compared to AAC encoding, and therefore does not add much overhead. Individual components can be resynthesized for re-purposing in structured media applications, or for synthetic coding as a perceptual audio model.

It is to be understood that various other adaptations and modifications may be made within the spirit and scope of the invention. Therefore, it is the object of the appended claims to cover all such variations and modifications as come within the true spirit and scope of the invention.

I claim:

1. A method for extracting features from a mixture of signals, comprising the steps of:

filtering the mixture of signals by a filterbank to produce a plurality of filtered signals;

windowing each filtered signal to produce a plurality of multi-dimensional observation matrices;

reducing the dimensionality of the multi-dimensional observation matrices; and extracting features from the reduced dimensionality matrices.

2. The method of claim 1 wherein the mixture of signals is obtained from a single source.

3. The method of claim 1 wherein the mixture of signals is obtained from multiple sources.

4. The method of claim 1 wherein the filtering is logarithmic in frequency.

5. The method of claim 1 wherein the filtering uses short time fast Fourier transforms.

6. The method of claim 1 wherein the filtering uses a wavelet filterbank.

7. The method of claim 1 wherein the filtering is frequency based and the filtered signal is a band-pass signal.

8. The method of claim 1 further comprising the step of:

normalizing the filtered signals by power spectral densities.

9. The method of claim 1 wherein the features include spectral and temporal features.

10. The method of claim 1 wherein the mixture of signals is classified according to the features.

11. The method of claim 1 further comprising the step of:

tracking the features over time.

12. The method of claim 1 wherein the mixture of signals is acoustic and includes non-speech sounds.

13. The method of claim 1 further comprising the step of:

synthesizing a new signal from the features by an inverse filterbank.

14. The method of claim 1 wherein the reducing is performed by singular value decomposition.

15. An apparatus for extracting features from a mixture of signals, comprising:

a filterbank filtering the mixture of signals to produce a plurality of filtered signals;

a segmentor windowing each filtered signal to produce a plurality of multi-dimensional observation matrices;

a digital signal processor reducing the dimensionality of the multi-dimensional observation matrices and extracting features from the reduced dimensionality matrices.

16. The method of claim 1, wherein the extracting is performed using independent component analysis.

17. The apparatus of claim 15, wherein independent component analysis is used by the digital signal processor in extracting features from the reduced dimensionality matrices.

18. The apparatus of claim 15, wherein singular value decomposition is used by the digital signal processor in reducing the dimensionality of the multi-dimensional observation matrices.

19. The apparatus of claim 17, wherein the independent component analysis includes rotating the deduced dimensionality matrices to obtain maximum statistical independence of the features.

20. The method of claim 16, wherein the independent component analysis includes rotating the deduced dimensionality matrices to obtain maximum statistical independence of the features.

* * * * *